3,255,346
RADIATION GAUGING SYSTEM WITH COMPENSATION FOR HIGH BACKGROUND RADIATION INTENSITIES
Donald C. Brunton and James M. McMullen, Columbus, Ohio, assignors to Industrial Nucleonics Corporation, a corporation of Ohio
Filed Oct. 30, 1961, Ser. No. 148,594
8 Claims. (Cl. 250—43.5)

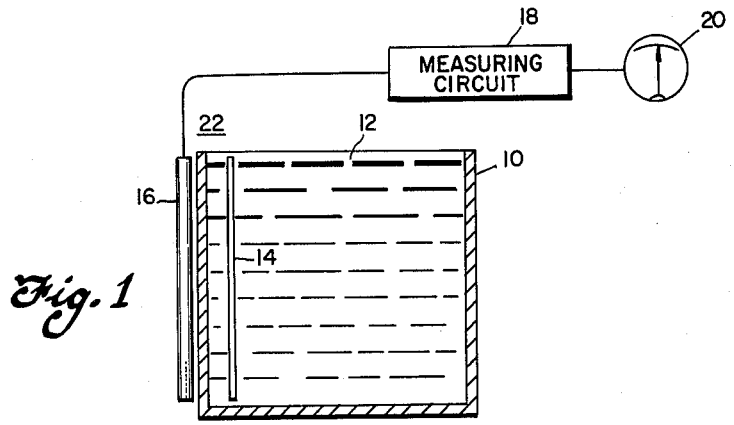
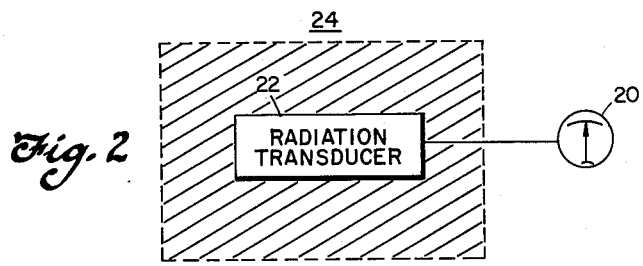
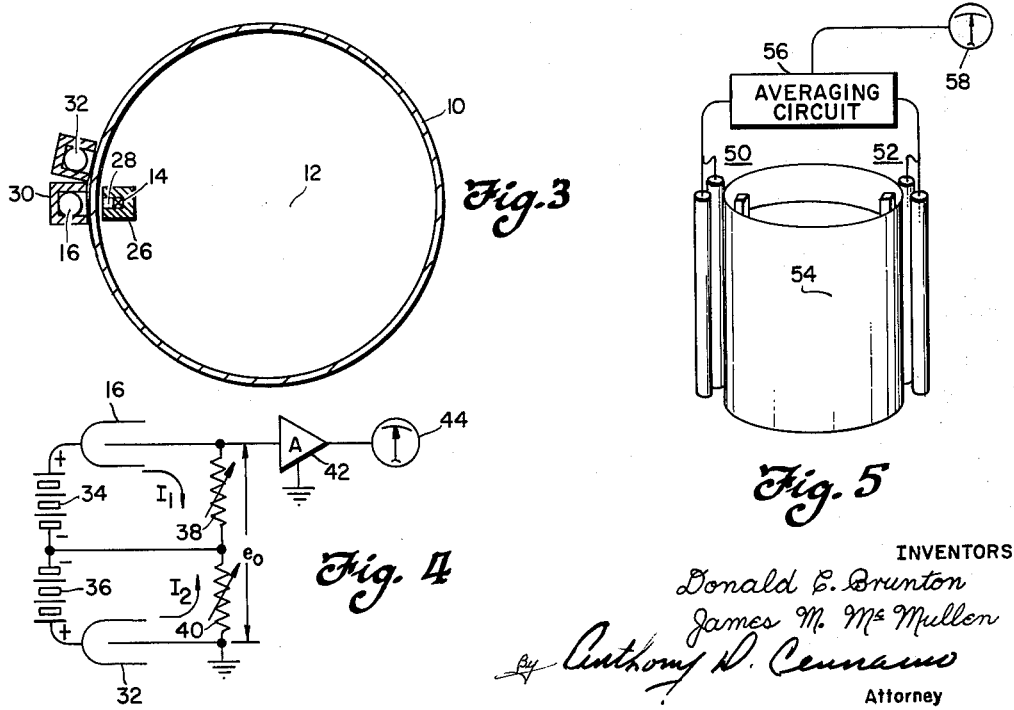
INVENTORS
Donald C. Brunton
James M. McMullen
Attorney United States Patent Office 3,255,346
Patented June 7, 1966

This invention relates generally to radiation detectors and more particularly to novel method and means for eliminating unwanted background produced by a radiation detector operating in a region of high radiation intensity.

Radiation measuring systems for measuring the thickness of a traveling sheet, the density of a gaseous medium, or the fill level of a tank are well known. Radiation from a source traverses the measured medium and a detector such as an ionization chamber or a Geiger-Mueller tube receives the unabsorbed radiation and translates the same into a usable electrical signal. The medium absorbs the radiation in accordance with certain of its chemical and physical properties. Accordingly, the generated electrical signal is interpreted in terms of the desired variable property.

A problem exists, however, when these measurements are made in a high radiation field. One example is the measurement of liquid level in the heat exchanger boiler of a nuclear reactor. Here the radiation field may be as high as one hundred roentgen per hour. As a result, a radiation detector is unable to distinguish the unabsorbed radiation provided by the measuring source from the radiation produced by the environmental field. The desired signal is masked by background noise and the value of the unknown variable cannot be discerned by the system.

The present invention provides another compensating detector subjected to substantially the same external field as the mesauring detector. The two detectors are connected in opposition to cancel the effect of the external field and only the desired measuring signal remains to be amplified and recorded.

Accordingly, it is a primary object of the present invention to provide a radiation measuring system for use in a high radiation field.

It is another object of he present invention to provide a radiation measuring system which is simple to construct and economical to install and maintain.

These objects as well as other features of the present invention will become more apparent from the following description taken in conjunction with the drawings, in which:

FIG. 1 is a sectional view of a radiation fill level measuring system;

FIG. 2 is a diagrammatic view of the system of FIG. 1 located in a high radiation field;

FIG. 3 is a top view of a measuring system in accordance with the present invention;

FIG. 4 is a schematic diagram of the measuring system shown in FIG. 3; and

FIG. 5 is an alternate fill level measuring system.

Referring to the drawings and specifically to FIG. 1, a tank 10 containing a liquid 12 is examined for fill level by an elongated radiation source 14 and detector 16. Since the response of the detector increases as the level falls, the electrical output of the detector 16 is proportional to the fill level of the liquid 12. A measuring circuit 18 and indicator 20 are connected to advise operating personnel of the fill level condition of the tank 10.

In FIG. 2, a radiation transducer 22 is located in a field of high radiation which is illustrated by the shaded area 24. The indication on meter 20 can no longer accurately represent changes in fill level due to the magnitude of the external field 24.

Referring to FIG. 3, the present invention provides a measuring system compensated for the field 24. The source 14 is surrounded by shielding 26 except for an aperture 28. The measuring detector 16 is similarly enclosed by shielding 30. Another detector 32 substantially identical to the measuring detector 16 is mounted alongside thereof. The radiation apertures of the measuring source 14 and detector 16 are adjacent to one another. With this collimating arrangement, no radiation from the source 14 reaches the compensating detector 32; however, the external field radiation does.

The detectors are electrically connected in opposition as shown in FIG. 4. Batteries 34 and 36 provide operating potential for the detectors 16 and 32 respectivley. Current $I_1$ and $I_2$ flow in opposite directions through load resistors 38 and 40 which may be variable. Output voltage $e_o$ is taken across the series resistor connection and coupled to an amplifier 42 and indicator 44.

In the operation of the system, the source 14 is removed and one or both of the resistors 38, 40 are adjusted to produce zero indication on the meter 44. It is not difficult to establish a balance to an accuracy of 1% and to reduce the effective background field to a very low value. With a background of 10 milliroentgen per hour, the source 14 must produce a field of one roentgen per hour in the measuring detector 16 to yield an accuracy of measurement of about one percent. For a given source-detector separation and a steel wall thickness of two inches, the source requirement will be 5 to 10 mc. per centimteer of length.

Nuclear reactors are frequently used as a source of power for seagoing vessels. The level measurement of boiler liquid has been hampered by the normal movements of the vessel. When the ship is under way, the level of the liquid at the detector may be quite different from the actual level measured when the ship is motionless.

Referring to FIG. 5, the present invention provides a pair of level measuring units 50 and 52 mounted at diametrically opposite sides of a cylindrical tank 54. The detectors are connected into averaging circuit 56 which provides a signal proportional to the average value of the two input signals. The computed average signal may be read out on a meter 58.

Regardless of how the liquid surface shifts with respect to the bottom of the tank, the level at one side of the tank will be as much above the actual level as the level at the other side of the tank is below. By adding the level measurements and dividing by two, the average level measurement obtained is equal to the actual fill height. This is true whether the ship is experiencing roll, pitch, or yaw, or a combination of these phenomena.

Although certain and specific embodiments have been shown, modifications may be made thereto without departing from the true spirit and scope of the invention.

What is claimed is:
1. Radiation gauging apparatus having a material receiving location therein for measuring the condition of a material in said location in the presence of high background radiation, comprising a gauging source of penetrative radiation, a pair of radiation detectors including a gauging detector and a background level detector, shielding means for said source and said detectors providing a substantially unrestricted path for radiation from said source to said material receiving location and from said location to said gauging detector, said shielding means providing means for substantially equally shielding both of said detectors from said background radiation and means for shielding said background level detector from substantially all radiation originating with said source, and means for comparing the outputs of said detectors to provide a signal indicating said material condition.

2. In a radiation gauging apparatus wherein the condition of a material is measured by placing the same between a gauging source of penetrative radiation and a gauging radiation detector, the improvement whereby said apparatus is adapted for operation in a field of high intensity background radiation, which comprises a second radiation detector located adjacent to said gauging detector, means including collimator means defining a path for radiation between said source and said gauging detector for shielding said second detector from substantially all radiation originating with said source, means providing substantially equal shielding for both of said detectors against said background radiation, and means for comparing the outputs of said detectors to provide a signal indicating said material condition.

3. In a tank level gauge having a radiation source mounted inside the tank and spaced from the wall thereof and a gauging radiation detector mounted outside said wall adjacent to said source, the improvement whereby said apparatus is adapted for operation in a field of high intensity background radiation, which comprises a second radiation detector located adjacent to said gauging detector, means including collimator means defining a path for radiation through said wall between said source and said gauging detector for shielding said second detector from radiation originating with substantially all said source, means providing substantially equal shielding for both of said detectors against said background radiation, and means for comparing the outputs of said detectors to provide a signal indicating the level of the contents in said tank.

4. Apparatus for measuring the fill level in a vessel containing a fluid in the presence of a high external radiation field, comprising a measuring source of radiation located inside said vessel and spaced from the wall thereof, a first and a second radiation detector positioned outside said vessel, each responsive to substantially the same flux from said external radiation field, collimating means around said source of radiation for directing the radiation therefrom toward only said first one of said detectors and substantially preventing all the radiation from said sources from reaching said second detector, said first detector being additionally responsive to radiation passing through said fluid from said source, and means for indicating the difference between the outputs of said radiation detectors to provide a measurement of said fill level independently of the effect of said external radiation field.

5. A system for measuring the fill level of a liquid in a vessel in the presence of an external radiation field comprising a source of radiation mounted inside said vessel and spaced from the wall thereof, means for directing a narrow beam of radiation from said source through said liquid in said space, a first radiation detector positioned outside said vessel wall in the path of said radiation beam, a second radiation detector located adjacent to said first detector outside said wall but out of said directed path of said radiation beam, and out of the path of any backscatter radiation from the liquid caused by said source, means for substantially equally shielding each of said detectors from said external radiation field, and means for indicating the difference between the radiations detected by said first and second detectors.

6. Apparatus for measuring the fill level of liquid contained in an upright cylindrical vessel subject to tilting in an environment of high intensity background radiation, said apparatus comprising a first gauging device located at one side of said vessel and extending vertically along an element thereof, a second gauging device located at the other side of said vessel diametrically opposite said first gauging device, each of said gauging devices including a radiation source mounted inside said vessel and spaced from the wall thereof, a gauging detector mounted outside said wall adjacent said source, a second detector located adjacent to said gauging detector, collimator means for directing a beam of radiation from said source only toward said gauging detector, means providing equal shielding for both of said detectors against said background radiation, and means for comparing the outputs of said gauging detector and said second detector to provide a signal indicative of said fill height at each side of said tank, means for computing the average value of said signals provided respectively by said first and said second gauging device, and means for indicating said computed average value.

7. Apparatus for measuring one or more properties of a material in a field of background radiation from an external source, said apparatus comprising:
 a source of radiation irradiating said material to be measured,
 a detector receiving radiation from both said material and said external source field to provide a signal that is a function of the intensity of said radiations,
 a second detector receiving only radiation from said external source field to provide a second signal that is a function of the intensity of said background radiation, and
 means for combining said signals to obtain an output signal that is a function of the intensity of only radiation from said material.

8. Apparatus for measuring one or more properties of a material in a field of background radiation, said apparatus comprising:
 a source of radiation irradiating said material to be measured,
 a detector receiving the combined radiations of both said material and said field to provide a signal that is a function of the intensity of said combined radiations,
 a second detector responsive to said background radiation for providing a second signal,
 means for substantially shielding said second detector from the reception of radiation from said material being measured, and
 means for combining said signals to obtain an output signal that is a function of said material properties irrespective of variations in the intensity of said background radiation.

References Cited by the Examiner

UNITED STATES PATENTS

| | | | |
|---|---|---|---|
| 2,285,840 | 6/1942 | Scherbatskoy | 250—83.6 |
| 2,323,128 | 6/1943 | Hare | 250—43.5 |
| 2,475,137 | 7/1949 | Herzog | 250—83.6 |
| 2,562,968 | 8/1951 | Teichmann et al. | 250—83.6 |
| 2,565,963 | 8/1951 | Graham | 250—43.5 |
| 2,763,790 | 9/1956 | Ohmart | 250—43.5 |
| 2,830,183 | 4/1958 | Wolfe | 250—43.5 |
| 2,836,726 | 5/1958 | Rich | 250—83.6 |
| 2,953,682 | 9/1960 | Frank et al. | 250—43.5 |
| 2,968,720 | 1/1961 | Hull | 250—43.5 |
| 3,132,248 | 5/1964 | Eggebraaten et al. | 250—83.3 |
| 3,144,554 | 8/1964 | Whitney | 250—83.3 |

RALPH G. NILSON, *Primary Examiner.*

ARCHIE R. BORCHELT, *Examiner.*

UNITED STATES PATENT OFFICE
CERTIFICATE OF CORRECTION

Patent No. 3,255,346  June 7, 1966

Donald C. Brunton et al.

It is hereby certified that error appears in the above numbered patent requiring correction and that the said Letters Patent should read as corrected below.

Column 3, line 28, for "radiation originating with substantially all said source," read -- substantially all radiation originating with said source, --.

Signed and sealed this 7th day of January 1969.

(SEAL)
Attest:

Edward M. Fletcher, Jr.

Attesting Officer

EDWARD J. BRENNER
Commissioner of Patents